United States Patent [19]
Hiszpanski

[11] 3,733,048
[45] May 15, 1973

[54] METERING VALVE

[75] Inventor: Jan A. Hiszpanski, Chicago, Ill.

[73] Assignee: Imperial-Eastman Corporation, Chicago, Ill.

[22] Filed: Feb. 11, 1971

[21] Appl. No.: 114,597

Related U.S. Application Data

[63] Continuation-in-part of Ser. No. 47,285, June 18, 1970, abandoned.

[52] U.S. Cl. ............... 251/205, 137/525, 137/529, 251/278
[51] Int. Cl. ............................................. F16k 15/14
[58] Field of Search .............. 251/205, 276, 278, 251/334; 137/525, 529, 525.5, 82

[56] References Cited

UNITED STATES PATENTS

| 3,642,026 | 2/1972 | Sielaff | 137/525 |
|---|---|---|---|
| 572,580 | 12/1896 | Spitzenberg | 251/278 |
| 3,294,360 | 12/1966 | Lundberg | 251/205 |
| 2,679,378 | 5/1954 | Uhler | 251/331 |
| 2,154,880 | 4/1939 | Twigg | 137/525.5 |
| 3,580,277 | 5/1971 | Gettel | 137/525.5 |
| 1,683,927 | 9/1928 | Smith | 251/276 |
| 1,623,431 | 4/1927 | McVoy | 137/529 UX |
| 2,970,608 | 2/1961 | Doeg | 137/525 X |

FOREIGN PATENTS OR APPLICATIONS

| 303,074 | 12/1928 | Great Britain | 137/529 |

*Primary Examiner*—Robert G. Nilson
*Attorney*—Hofgren, Wegner, Allen, Stellman & McCord

[57] ABSTRACT

A fine metering valve having a deflectible beam and means for deflecting the beam adjustably in close spaced juxtaposition to a valve port thereby to vary the rate of fluid flow therethrough. A displacement reduction means is utilized in providing the deflection of the beam to give high accuracy in the metering of the fluid flow. The deflecting means may be manually operated or automatically operated, as desired. Means are provided for positively displacing the beam to fully close the valve when desired.

35 Claims, 8 Drawing Figures

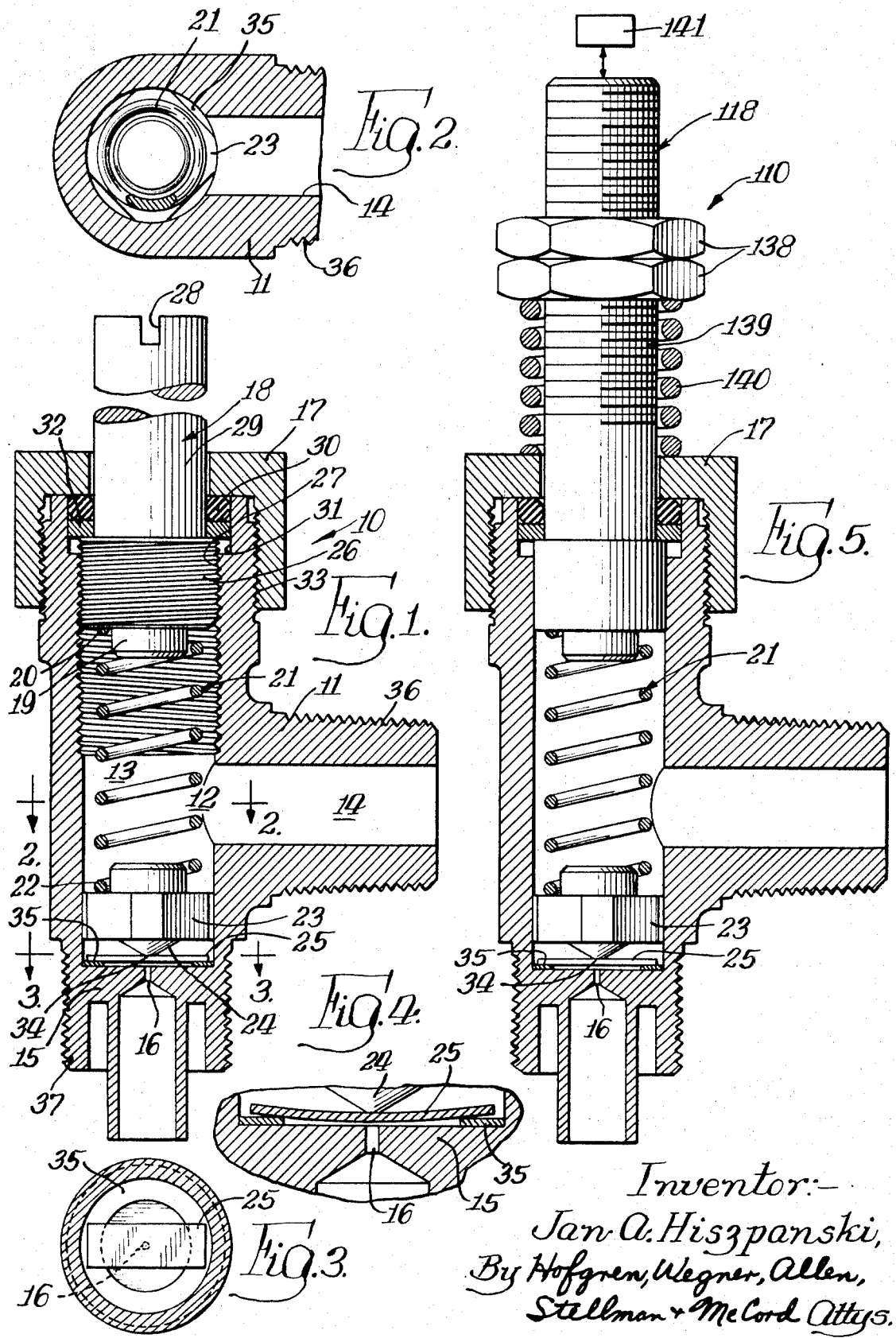

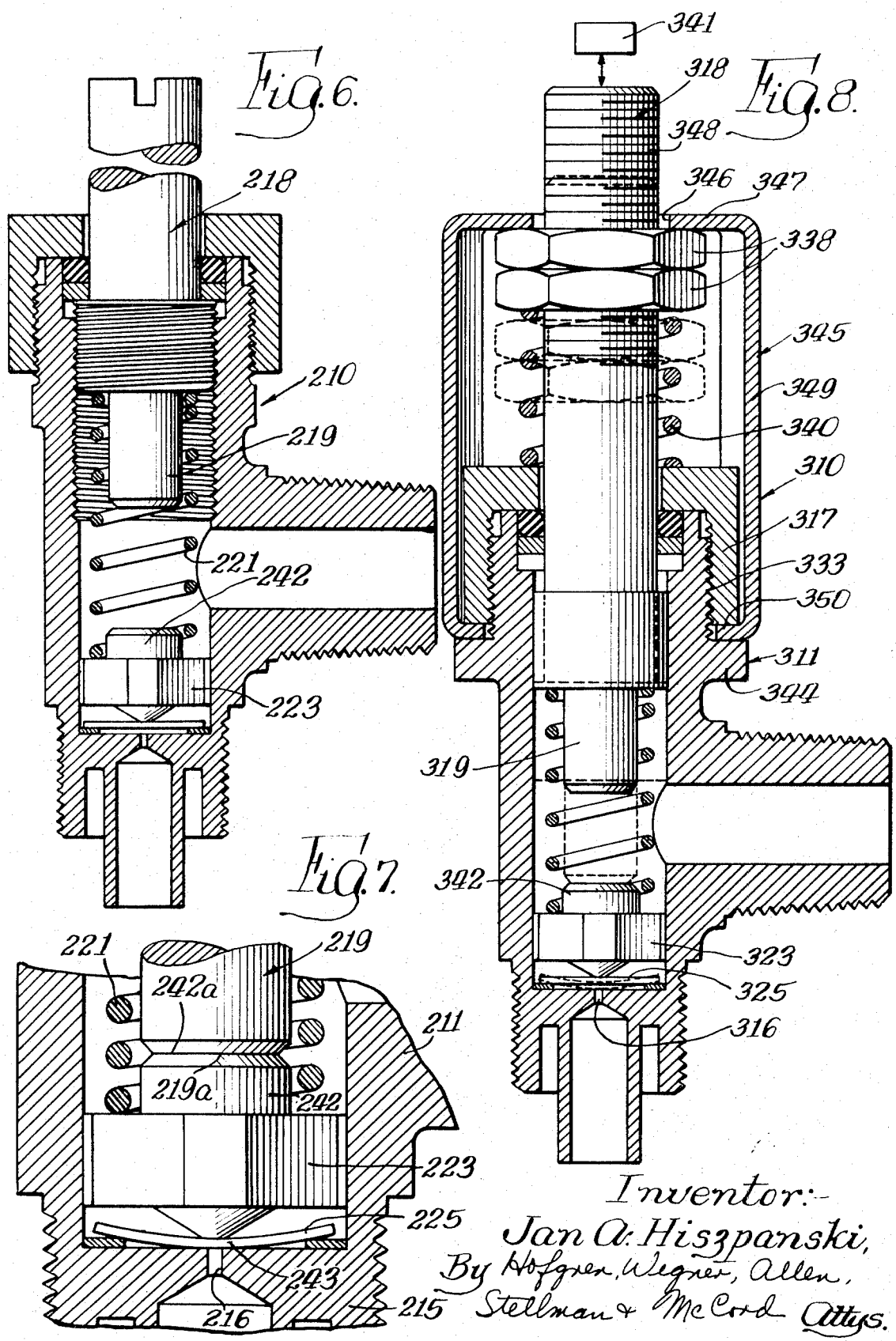

3,733,048

METERING VALVE

CROSS-REFERENCE TO RELATED APPLICATION

This application comprises a continuation-in-part of my copending application for U.S. Letters Patent, Ser. No. 47,285, filed June 18, 1970 for a Metering valve, now abandoned.

BACKGROUND OF THE INVENTION

1. Field of the Invention

This invention relates to metering valves and in particular to fine metering valves wherein accurate control of low fluid flow rates is provided.

2. Description of the Prior Art

The conventional fine metering valve comprises a needle valve which is selectively axially displaced in a cylindrical orifice. Conventionally, such needle valves have a taper of approximately 1° to 3°. Control of the fluid flow results from the small variation of the flow obstruction area defined between the outer surface of the needle and the end edge of the orifice wall.

Such needle-type fine metering valves have the serious disadvantage of difficulty of manufacture and resulting high cost. Illustratively, each of the parameters of needle diameter, needle taper, and orifice diameter must be closely controlled as each of these enters into the resultant flow control. It is almost impossible to maintain perfect conicity in the needle. Aberrations such as ovality and eccentricity in the needle taper result in a "humping" of the flow characteristics, a common aberration in such needle valves. Further, where small flows are to be controlled, the parameters become very small. The thin needle is highly susceptible to breakage or distortion, further reducing the accuracy of the control by such means.

One attempted solution to this problem has been to provide a valve wherein control of flow through a port, or orifice is effected by means of an arcuate closure member which is adjustably sprung toward a flat condition wherein the closure member extends across the port to close the same. Such metering valves continue to present the problem of difficulty of accuracy in preselecting the flow characteristics of the valve as the arcuate configuration is difficult to maintain from valve to valve. Another disadvantage of such curved disc valves is the limitation of accuracy in deforming the arcuate disc not only because of tolerance variations in the manufacture of the disc, but also because of limitations in the means for controlling the deflection.

SUMMARY OF THE INVENTION

The present invention comprehends an improved fine metering valve eliminating the disadvantages of the above discussed metering valves in a novel and simple manner. More specifically, the present invention comprehends a fine metering valve utilizing a deflectible flat beam and means for deflecting the beam adjacent a valve port to vary accurately a fluid flow therethrough. The beam is deflected by a displacement reduction means which permits accurate fine deflection of the beam to provide corresponding accurate fine control of the fluid flow.

One form of such deflection means comprises a spring acting against the beam and compressed by a suitable compression means to provide the deflection force. The compression means may comprise a manually operable threaded member. Alternatively, the compression means may comprise a means movable to a preselected spring compressing position. Illustratively, the compressing means may comprise a solenoid operated force member and cooperating stop means for limiting the spring compressing movement thereof. The stop means may be adjustable to provide variable spring compression and resultingly variable fluid flow rates.

The beam is preferably elongated and provided with a mid-portion juxtaposed to the port to effect the desired fluid flow control. The displacement reduction ratio may be over approximately 10 to 1 and in the illustrated embodiment is approximately 100 to 1. The beam may be positioned relative to the port by a suitable spacer providing facilitated adjustment of the flow control by use of any one of a series of different spacers. The beam preferably has a width substantially greater than the width of the port. The beam is preferably formed of an elastic material which is relatively hard while yet precluding a permanent set as a result of the normal deflection forces utilized.

The invention further comprehends the provision of such a metering valve wherein means are provided for applying a direct force to the beam greater than that applied through the spring so as to positively seat the beam across the valve port to close the valve. The means for positively closing the valve may comprise means carried by the force-applying portion of the displacement reduction means.

Still further, the invention comprehends the provision in such a fine metering valve of means for maintaining a preselected deflection of the beam upon release of the displacement reduction means. Thus, the valve may be operated to provide a preselected controlled flow which is automatically obtained upon opening of the valve. The deflection maintaining means may comprise adjustable means so that any one of a plurality of different preselected flow rates may be obtained upon such release of the displacement reduction means.

BRIEF DESCRIPTION OF THE DRAWING

Other features and advantages of the invention will be apparent from the following description taken in connection with the accompanying drawing wherein:

FIG. 1 is a fragmentary diametric section of a metering valve embodying the invention;

FIG. 2 is a fragmentary transverse section taken substantially along the line 2—2 of FIG. 1;

FIG. 3 is a fragmentary transverse section taken substantially along the line 3—3 of FIG. 1;

FIG. 4 is a fragmentary enlarged diametric section illustrating the arrangement of the beam in a deflected position;

FIG. 5 is a diametric section of a modified form of metering valve embodying the invention;

FIG. 6 is a fragmentary diametric section of a modified form of metering valve embodying the invention;

FIG. 7 is a fragmentary enlarged diametric section illustrating the arrangement of the valve of FIG. 6 in a closed condition; and FIG. 8 is a diametric section of still another modified form of metering valve embodying the invention.

DESCRIPTION OF THE PREFERRED EMBODIMENTS

In the exemplary embodiment of the invention as disclosed in FIGS. 1-5 of the drawing, a fine metering valve generally designated 10 is shown to comprise a body 11 defining a flow passage generally designated 12 including a first portion 13 and a second portion 14 extending right angularly into first portion 13. The body includes a wall portion 15 defining a valve port 16 at one end of passage portion 13.

At the opposite end of passage portion 13, the passage portion is closed by a cap nut 17 through which extends a stem 18. Stem 18 includes a spring retainer portion 19 bearing against one end 20 of a coil spring 21 having its opposite end 22 abutting a deflector member 23. Deflector member 23 includes a frustoconical bearing portion 24 engaging a beam 25 which is disposed in passage portion 13 closely adjacent port 16 for controlling fluid flow through the port as discussed in greater detail herefollowing. Stem 18 includes a threaded portion 26 threaded into a threaded end portion 27 of passage portion 13 to provide adjustable compression of spring 21 resultingly to provide adjustable deflection of beam 25 by deflector member 23.

Illustratively, the thread of portions 26 and 27 may comprise a five-sixteenth inch 48 UNS thread to provide a fine control of the compression of spring 21. Stem 18 may include a slot 28 at its outer end for manual rotation thereof as by a suitable screwdriver, or the like.

The outer end 29 of stem 18 comprises a smooth cylindrical portion movably sealed to the body 11 and cap nut 17 by means of O-ring 30 received in an axially outwardly opening recess 31 at the upper end of passage portion 13. The O-ring is backed up by a rigid ring 32 whereby threaded advancement of cap nut 17 on threaded outer surface 33 of the body compresses the O-ring sealingly against the body and stem as shown in FIG. 1.

Spring 21 is preselected to provide the desired mechanical advantage. Illustratively, the spring may be formed of stainless steel to have a spring constant of approximately 10 lbs. per inch. In the illustrated embodiment, the spring has an outer diameter of 0.240 inch and is formed of 0.026 inch stainless steel wire. The spring may have a free length of approximately five-eighths inch.

Deflector member 23 is preferably formed of a relatively hard material, such as a metal. Illustratively, the deflector member may be formed of brass. Bearing portion 24 defines a small flat circular tip 34 illustratively having a diameter of approximately 0.02 inch bearing against the center of beam 25. The beam is spaced from wall 15 by a suitable annular spacer 35. Illustratively, spacer 35 may comprise a shim strip formed of a relatively hard metal, such as cold rolled type 302 stainless steel. The spacer, illustratively, may have a thickness of approximately 0.002 inch where the diameter of port 16 is approximately 0.0145 inch. Beam 25 is preferably formed of a resilient strong material, such as stainless steel, and illustratively, may comprise a type 17-7PH stainless steel. Illustratively, the beam material may have a relatively high tensile strength such as of at least approximately 130,000 psi. The beam, in the illustrated embodiment, illustratively has a length of approximately 0.265 inch, a width of approximately 0.100 inch, and a thickness of approximately 0.009 inch. The strip is preferably flat and in the illustrated embodiment, is maintained flat within a 0.0003 inch for controlled accuracy in the regulation of fluid flow through port 16. The beam is preferably heat treated to have a hardness of approximately Rockwell C scale 43.

Connections to the valve may be effected to a threaded portion 36 at one end of passage 14 and a threaded portion 37 at the bottom of the valve outwardly of port 16.

As shown in FIG. 4, control of fluid flow through port 16 is effected by deflection of beam 25 as a result of downward displacement of deflector portion 24. As the beam is spaced from wall portion 15 by spacer 35, the flow of fluid under the mid-portion of the beam may be varied over a substantial range. As shown in FIG. 3, the width of beam 25 is substantially greater than the diameter of port 16 to assure accurate control of the fluid flow. As discussed above, the beam may have a width of over approximately six times the diameter of the port. The deflection of the beam is preferably less than approximately the diameter of the port. In the illustrative embodiment, the spacer thickness is less than approximately one-half of the port diameter and more specifically is in the range of approximately 0.002 to a 0.005 inch to effect the desired flow control. The beam may remain spaced from the port in the maximum deflected disposition wherein the valve has maximum flow restrictions.

The deflection of the beam by the rotation of stem 18 provides a deflection reduction mechanical advantage in that this small displacement of the beam requires a substantial movement of the stem. Illustratively, at least approximately 10 turns of the stem may be utilized to effect full deflection of the beam. As the flow restriction results from the movement of the center portion of the beam toward and from the port 16, a substantially straight line relationship is obtained between the flow control and the amount of rotation of stem 18. The desirable deflection reduction results from the mechanical advantage effect of the threaded stem 18 and compressible spring 21. The deflection reduction means may be varied by suitable variation in the thread configuration as well as in the spring configuration and properties. The differential of the spring constants of the spring 21 and beam 25 may provide a deflection reduction of over approximately 10 to 1 and in the illustrated embodiment, the reduction is over approximately 100 to 1.

A variation in the maximum flow rate through the valve may be obtained by suitable substitution of different thickness spacers 35 as desired.

As discussed above, the beam may be accurately controlled as to flatness and size whereby accurate control in the preselection of the flow variation characteristics of the metering valve may be readily effected. Adjustment of the metering valve to accommodate different flow conditions may be readily effected by suitable substitution of any one or all of the spring, spacer, beam, and threaded stem and body portions.

The valve is extremely simple and economical of construction. The parts may be readily assembled through the open upper end of passage portion 13, as shown in FIG. 1. Thus, substitution of the desired elements may be readily effected.

If desired, the deflection of beam 25 may be effected by substitution of a modified stem 118 for stem 18, as shown in FIG. 5. Stem 118 includes an adjustable collar in the form of nuts 138 on an upper threaded portion 139 of the stem. A retractor coil spring 140 is mounted about the stem between collar 138 and cap nut 17 to urge the stem upwardly to the retracted position of FIG. 5. Downward movement of the stem is effected by suitable actuator 141 which may comprise any conventional actuator, such as a pushbutton, mechanical camming device, electrical solenoid, air pressure solenoid, mechanical lever system, etc. Actuator 141 serves to force stem 118 downwardly to effect compression of spring 21 and thereby effect deflection of beam 25 in valve 110 in the same manner as downward movement of stem 18 effects deflection of beam 25 in valve 10. Thus, valve 110 comprises a directly actuated valve for automatic control of the fluid flow. In all other respects, valve 110 functions similarly to valve 10.

Turning now to the embodiment of FIG. 6, a further modified form of fine metering valve generally designated 210 is shown to comprise a metering valve generally similar to valve 10 but having means for effectively closing the valve port in a closed condition of the valve. More specifically, as seen in FIGS. 6 and 7, the stem 218 is provided with an elongated spring retainer 219 adapted to engage the spring retainer 242 carried by the deflector member 223 at a lowermost position of the stem. Spring retainer 219 includes a lowermost surface 219a which engages an uppermost surface 242a of spring retainer 242 in the abutting relationship of the spring retainers. The direct transfer of force from stem 218 to stem 225 through the deflector member permits a further deflection of the beam whereby the mid-portion 243 of the beam seats on the wall 215 of body 211 to close flow port 216 and thereby place the valve in a closed condition. The spacing between the turns of spring 221 is preselected to permit such engagement between the spring retainers 219 and 242 without bottoming of the spring turns as shown in FIG. 7.

Thus, valve 210 may be utilized in the manner discussed above relative to valve 10 as a fine metering valve and also as a shutoff valve thereby obviating the need for a separate shut-off valve in series with the fine metering valve, for improved facilitated flow system arrangement. In all other respects, valve 210 is similar and functions similarly to valve 10.

Referring now to the embodiment of FIG. 8, a still further modified form of fine metering valve generally designated 310 is shown to comprise a valve generally similar to valves 110 and 210 but further including means for providing a preselected metering adjustment of the valve upon release of the displacement reduction means. More specifically, body 311 includes an annular flange 344 subjacent threaded outer surface 335. A yoke member 345 is mounted on the body with a central opening 346 in the bight portion 347 of the yoke freely receiving the threaded upper end 348 of the valve stem 318. The legs 349 are provided with an inturned distal portion 350 which is clamped between the cap nut 317 and shoulder 344 to secure the yoke to body 311.

Collar nuts 338 are threadedly adjusted on stem 318 in the manner described above relative to nuts 138 of valve 110. However, in valve 310, the outward travel of the nuts is limited by the abutment thereof with bight 347 of yoke 345. Thus, withdrawal of the stem 318 is automatically limited to any one of a plurality of different adjusted positions effected by suitable adjustment of nuts 338 on the stem whereby release of the displacement reduction means automatically opens the valve to the preselected fine metering position. Stem 318 may be provided with an elongated spring retainer 319 which, when in the lowermost position shown in dotted lines in FIG. 8, abuts spring retainer 342 of the deflector member 323 to direct the transfer force directly from the stem to the beam 325 to effect a closing of the port 316 as described relative to valve 210. The turns of retractor coil spring 340 are spaced sufficiently so as to permit the engagement of the spring centering devices 319 and 342 without bottoming of the spring turns.

Thus, valve 310 provides an improved fluid flow control permitting complete cutoff of the flow when desired by a direct force transfer from the force-applying means to the deflectible beam and further providing an improved fine metering control by utilization of the displacement reduction means yieldably deflecting the beam to provide accurately different desired fluid flow rates. Valve 210 further permits the user to preselect the desired fluid flow rate so that upon release of the displacement reduction means by actuator 341, the desired fluid flow rate is automatically obtained by the retraction of the stem 318 to the preselected position controlled by the adjustment of nuts 338. Changes in the preselected adjustment are simply and readily effected by simple readjustment of nuts 338 on stem 318. Thus, valve 310 functions generally oppositely to valve 110 in control of the fine metering rate in that in valve 110, the selected fine metering rate is obtained by the downward movement of the stem to the bottomed condition of the spring 140 whereas in valve 310, obtaining of the preselected fine metering rate is provided by release of the stem to permit expansion of the spring 340. Thus, effectively, nuts 338 define means for providing a preselected minimum deflection of the beam for providing the preselected desired metered flow. Other than as discussed above, valve 310 is similar to and functions similarly to valves 10, 110, and 210.

In disclosing the respective valves, similar reference numerals have been applied to similar structural elements except that in valve 110, the reference numerals are 100 higher than those in valve 10; in valve 210, are 200 higher; and in valve 310, the reference numerals are 300 higher.

The foregoing disclosure of specific embodiments is illustrative of the broad inventive concepts comprehended by the invention.

I claim:

1. A fine metering valve comprising: valve body means defining a flow passage having a port; a deflectible flat beam having a transverse area less than that of said flow passage; means for positioning the beam in said flow passage spaced closely inwardly of said port; and displacement reduction means operable as the result of a relatively large input movement and a relatively small output movement for deflecting said beam controlledly toward the port to provide accurately fine adjustment of fluid flow through the flow passage past the beam.

2. The fine metering valve of claim 1 wherein said beam is fixedly supported at its opposite ends.

3. The fine metering valve of claim 1 wherein the maximum deflection of said beam by said displacement reduction means is in the range of less than approximately the diameter of said port.

4. The fine metering valve of claim 1 wherein the maximum deflection of said beam by said displacement reduction means is in the range of approximately 50 percent the diameter of said port.

5. The fine metering valve of claim 1 wherein the maximum deflection of said beam by said displacement reduction means is in the range of approximately 0.002 to 0.005 inch.

6. The fine metering valve of claim 1 wherein the displacement reduction means comprises spring means arranged to provide a displacement reduction of over approximately 10 to 1.

7. The fine metering valve of claim 1 wherein the displacement reduction means comprises spring means arranged to provide a displacement reduction of approximately 100 to 1.

8. The fine metering valve of claim 1 wherein said displacement reduction means includes spring means, and means for deflecting said spring means for applying a deflection force to said beam.

9. The fine metering valve of claim 8 wherein said deflecting means comprises threaded means providing further displacement reduction in effecting deflection of said beam.

10. The fine metering valve of claim 1 wherein said displacement reduction means includes spring means and means for deflecting said spring means for applying a deflection force to said beam, and said deflecting means comprises a plunger and means for axially displacing the plunger.

11. The fine metering valve of claim 1 wherein said displacement reduction means includes spring means and means for deflecting said spring means for applying a deflection force to said beam, and further includes means for providing a preselected deflection of said spring means to provide a corresponding preselected deflection of said beam.

12. The fine metering valve of claim 1 wherein said displacement reduction means includes spring means and means for deflecting said spring means for applying a deflection force to said beam, said deflection means comprising a plunger and means for axially displacing the plunger, and stop means for providing a positive limit to the travel of said plunger to provide a preselected deflection of said spring means to provide a corresponding preselected deflection of said beam.

13. The fine metering valve of claim 1 wherein said positioning means comprises spacer means supporting portions of said beam disposed to opposite sides of said port.

14. The fine metering valve of claim 1 wherein said displacement reduction means includes means for biasing said fine metering valve to a retracted position whereby said beam is normally undeflected.

15. The fine metering valve of claim 1 wherein said beam has a width greater than the width of said port.

16. The fine metering valve of claim 15 wherein said beam has a width at least approximately six times greater than the width of said port.

17. The fine metering valve of claim 1 wherein said beam is formed of a material having a tensile strength of at least approximately 130,000 psi.

18. The fine metering valve of claim 1 wherein said beam is formed of a hard material effectively precluding undesirable local deformation of a contact area of the displacement reduction means with the beam.

19. The fine metering valve of claim 18 wherein said beam is formed of an elastic material effectively precluding permanent set of the beam as a result of a deflection thereof in said valve.

20. The fine metering valve of claim 1 further including adjustable means for maintaining a preselected deflection of the beam upon release of said displacement reduction means.

21. The fine metering valve of claim 1 wherein said beam is flat and means are provided for deflecting said beam to a curved arrangement to vary the spacing of said second portion from said port.

22. The fine metering valve of claim 21 wherein said supporting means comprises a spacer abutting said port defining member.

23. The fine metering valve of claim 21 wherein said supporting means supports said beam at a portion defining the opposite ends thereof.

24. The fine metering valve of claim 21 wherein said supporting means supports said beam at a portion defining the opposite ends thereof and the center of said beam overlies said port.

25. The fine metering valve of claim 1 wherein said beam is flat, means are provided for deflecting said beam to a curved arrangement to vary the spacing of said second portion from said port, and further including adjustable means for maintaining any one of a plurality of different deflections of the beam upon release of said deflecting means.

26. The fine metering valve of claim 1 wherein said displacement reduction means includes yieldable means and means for adjustably deflecting said yieldable means for applying a variable resilient force to said beam, and said valve further including means for applying a direct force to said beam greater than that applied through said yieldable means for further deflecting the beam to close said port.

27. The fine metering valve of claim 26 wherein said direct force applying means comprises means interconnecting said deflecting means and said beam.

28. The fine metering valve of claim 27 wherein said interconnecting means comprises a force-applying surface on said deflecting means and surface means associated with said beam engaged by said force-applying surface.

29. The fine metering valve of claim 26 further including means for limiting the withdrawal movement of said deflecting means.

30. The fine metering valve of claim 26 further including means for limiting the withdrawal movement of said deflecting means to a preselected position providing a preselected minimum deflection of said beam.

31. The fine metering valve of claim 26 further including adjustable means for limiting the withdrawal movement of said deflecting means to any one of a plurality of positions providing a corresponding one of a plurality of different deflections of said beam.

32. The fine metering valve of claim 26 wherein said yieldable means comprises a coil spring and said means for adjustably deflecting the spring means comprises a force-applying member acting against one end of the spring, the other end of the spring being directly connected to said beam for transferring force yieldably from the force-applying member to the beam, said means for applying a direct force to said beam comprising means carried for movement with the force-applying member and having direct connection to the beam at an extreme compressed condition of the spring.

33. The fine metering valve of claim 32 wherein said means carried for movement with the force-applying member comprises an element projecting coaxially through the coil spring.

34. A fine metering valve comprising: valve body means defining a flow passage having a port; a deflectible flat beam having a transverse area less than that of said flow passage; means for positioning the beam in said flow passage spaced closely inwardly of said port; displacement reduction means operable as the result of a relatively large input movement and a relatively small output movement for deflecting said beam controlledly toward the port to provide accurately fine adjustment of fluid flow through the flow passage past the beam; and means for selectively varying the spacing of said beam from said port.

35. The fine metering valve of claim 34 wherein said spacing varying means comprises selectively installable variable width spacer means disposed between the beam and the valve body.

* * * * *